Feb. 20, 1968  A. FENER  3,369,953

MEANS FOR SEALING THE SLIT OF A LENGTHWISE-SLIT CARDBOARD TUBE

Filed Feb. 12, 1965

INVENTOR,
Alfred Fener,
BY

ATTORNEY.

United States Patent Office 3,369,953
Patented Feb. 20, 1968

3,369,953
MEANS FOR SEALING THE SLIT OF A LENGTH-
WISE-SLIT CARDBOARD TUBE
Alfred Fener, 422 Beach 146th St.,
Neponsit, N.Y. 10031
Filed Feb. 12, 1965, Ser. No. 432,143
2 Claims. (Cl. 156—583)

ABSTRACT OF THE DISCLOSURE

A pair of spaced parallel electrically-actuated heating wires on a sealing bar carried on and along a fixed horizontal cantilever beam, cooperate with a pressure bar which is movable towards and away from the sealing bar, to heat seal a thermoplastic tape to the interior surface of a lengthwise-slit tube placed on said beam as a sleeve thereon. Said tape coming off a supply roll near the fixed end of the beam, is fed through said tube and lies on the sealing bar, along and across said slit, with its lead end releasably held at the free end of said beam; the beam length being greater than the longest tube to be worked on.

---

The present invention relates to and its main object is to provide novel and improved means for sealing the slit of lengthwise-slit cardboard tubular members, as for instance, drum liners.

Another object of this invention is to provide a novel and improved means to seam a slit in tubular members, which is simple in construction, reasonable in cost, easy to manipulate, automatic in positioning a supply of sealing material for the next seam to be made upon removal of a finished piece of work and which is efficient in carrying out the purposes for which it is designed.

Other objects and advantages will become apparent as this disclosure proceeds.

For the practice of the method taught herein, the interior surfaces of the lengthwise-slitted tubular members are coated with a thermoplastic film. A thermoplastic tape is laid along and across the slit and heat sealed along its longitudinal edges, to said coating.

As a preferred embodiment of apparatus for the practice of said method, same may comprise a sealing bar mounted along a fixed cantilever beam which is horizontally positioned; said sealing bar having a pair of spaced parallel heating wires adapted for electrical actuation; the length of said wires along said beam, being greater than the longest tube to be worked on. A pressure bar is movable towards and away from said sealing bar, by an associated air cylinder. A continuous supply of thermoplastic tape or ribbon comes off a roll near the fixed end of said beam, and lays atop the sealing bar; its lead end being releasably held at the free end of said beam.

In the accompanying drawing forming part of this specification, similar characters of reference indicate corresponding parts in all the views.

Figure 1:
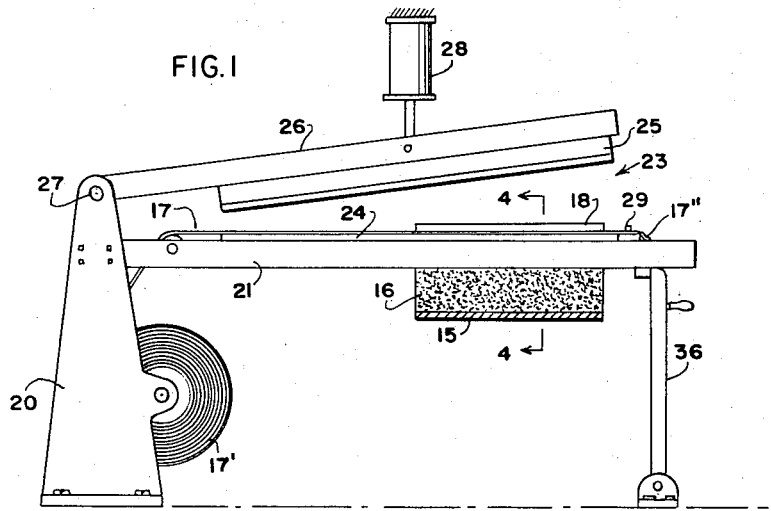
FIG. 1, is a front elevational view of an apparatus for the practice of the method taught herein. The liner being worked on, is shown in section, and all actuating means are omitted.
Figure 2:
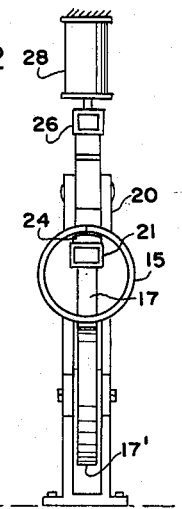
FIG. 2 is an end view of FIG. 1, with omissions to attain clarity of illustration.
Figure 3:
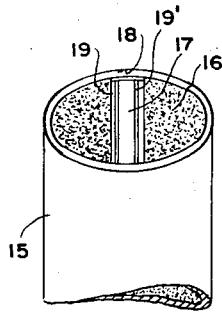
FIG. 3 is a fragmentary perspective view of a liner showing its lengthwise slit sealed in accordance with this invention. This view is enlarged.
Figure 4:
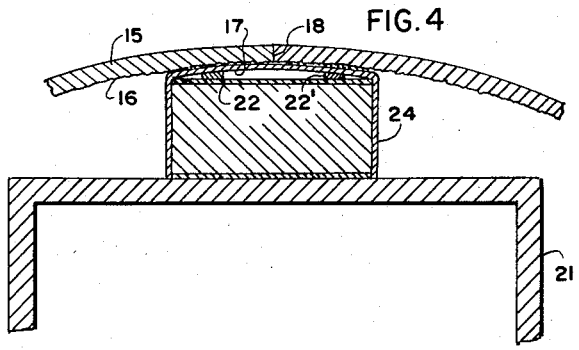
FIG. 4 is an enlarged fragmentary section taken at line 4—4 in FIG. 1.

My method, as mentioned, is to have the interior surface of the lengthwise-slit, tubular fiber board or cardboard liner 15, made so that its inner surface is coated with a thermoplastic film 16. Then I lay a thermoplastic tape or ribbon 17, inside the tube 15, along and across the slit 18, and heat seal the longitudinal edges to said coating 16, as indicated by the continuous seam lanes 19, 19'.

An apparatus for the economical and convenient practice of this method, is shown in FIG. 1 of the drawing, which shows a standard, or other suitable frame structure 20, supporting a roll 17' of thermoplastic ribbon 17, and a horizontal cantilever beam 21 above the ground. The numeral 23 indicates generally an electric heat sealing device of the thermal impulse type, operating on the well known principle as is set forth for instance in the Langer Patent No. 2,460,460, which may be referred to for details of structure for the sealing bar 24 and the pressure bar 25 herein; said bars cooperating to seam thermoplastic films interposed between them. In the present invention however, the sealing bar 24 has two spaced parallel heating tapes 22, 22' therealong, and is mounted atop and along said beam 21. The pressure bar 25 is positioned above and opposite said sealing bar, on the underside of a beam 26 which is swingably mounted on the frame 20 at 27, and may be shifted by the pneumatic cylinder 28, so the pressure bar 25 is brought towards and away from the sealing bar 24. Coming off the roll 17', the ribbon 17 is stretched atop and along the sealing bar 24, with its lead end 17'' releasably held by the spring clamp 29, near the free end of the beam 21.

Figure 6:
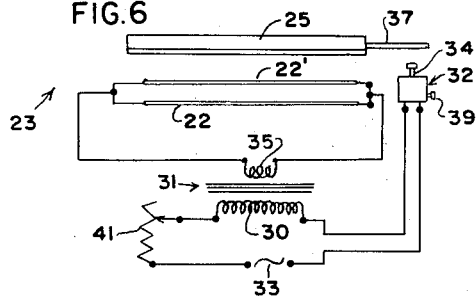
FIG. 6 is a wiring diagram of the circuit for operating the heat sealing means.
Figure 5:
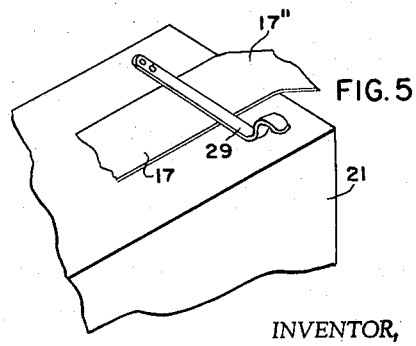
FIG. 5 is an enlarged fragmentary perspective view showing the free end of the work-supporting beam and the spring clamp means to hold the lead end of the thermoplastic ribbon used to seal the slit in the liner.

An operating circuit for actuating the heating tapes 22, 22', is shown in FIG. 6, wherein the primary winding 30 of a step-down transformer 41, in series with an adjustable rheostat 31 and a time delay switch 32, are connected as a group across the terminals of a source of alternating current 33. This time delay switch 32 is of the type which closes an electric circuit upon its actuating plunger 34 being depressed and automatically opens said circuit, a predetermined time delay period thereafter; the length of such time delay being adjustable by means of the adjusting screw 39. This switch means is well known in the art, so no further description or showing thereof is necessary. The secondary winding 35 of said transformer is connected across each of the heating tapes 22, 22'.

Normally, the beam 26 is in raised position as in FIG. 1, so the liner 15, to be worked on can be set on the beam 21, to rest on the sealing bar 24, with the slit 18 of said liner along the longitudinal mid-line of said sealing bar. Actually, said liner rests on the ribbon 17 which is on said sealing bar. A swingable prop 36 may be provided for supporting the end of the beam 21, while the beam 26 is lowered by operation of the cylinder 28, causing an arm 37 on the beam 26 to depress the plunger 34 of the delay switch 32. It is evident that this will cause the tape 17 to be heat sealed along its longitudinal edges as shown at 19, 19'. Allowing a short period for the seams to cool while the pressure is applied by the pressure bar 25, the beam 26 is then raised, the prop 36 swung down, and the liner 15 is pulled off. Of importance to note is that this removal of the finished work, permits a fresh length of tape 17 to be fed onto the sealing bar. The lead end of said tape 17 is of course released from the clamp 29 before removing the work, then when the liner is off, the tail end of the ribbon thereon is cut and the new lead end of said tape is pulled to make the tape taut and then set into the clamp 29, automatically making the apparatus ready to receive another liner to be worked on.

It may be noted that the usual practice in heat sealing apparatus apparatus, is to have the sealing and pressure bars, Teflon covered so the work does not stick to them.

This invention is capable of numerous forms and various applications without departing from the essential features herein disclosed. It is therefore intended and desired that the method and apparatus as described shall be deemed merely illustrative and not restrictive and that the patent shall cover all patentable novelty herein set forth; reference being had to the following claims rather than to the specific description and showing herein to indicate the scope of this invention.

I claim:

1. In an apparatus for sealing the slit of a lengthwise-slit, interiorly thermoplastic coated cardboard tube, the combination of a frame, a cantilever beam extending from said frame, a heat sealing device of the thermal impulse type having elongated sealing and pressure bars opposite one another; the sealing bar being on and along said beam and having two elongated heater elements in a predetermined spaced relation thereon, facing said pressure bar; said heater elements being adapted to be heated by passing a pulse of current therethrough, means on said frame to guide a thermoplastic tape coming freely off a supply, from a region near the fixed end of said beam to lie over and along said heating elements, clamp means at the free end of said beam for releasably holding the free end of the tape so the entire sealing bar has tape therealong, and means for relatively moving said pressure bar and beam towards and away from each other; said beam and sealing bar as a unit, being adapted to receive about them, a tube to be worked on by said apparatus.

2. An apparatus as defined in claim 1, wherein said beam is stationary on the frame.

References Cited

UNITED STATES PATENTS

| 2,248,248 | 7/1941 | Nye et al. | 156—583 X |
| 2,574,094 | 11/1951 | Fener et al. | 156—583 |
| 2,574,095 | 11/1951 | Langer | 156—583 |
| 2,579,488 | 12/1951 | Freeman | 156—297 X |
| 2,795,264 | 6/1957 | Pechy | 156—505 X |
| 2,918,106 | 12/1959 | Fener | 156—583 X |

EARL M. BERGERT, *Primary Examiner.*

HAROLD ANSHER, *Examiner.*